United States Patent
Kimijima et al.

(10) Patent No.: US 8,531,583 B2
(45) Date of Patent: Sep. 10, 2013

(54) IMAGE CAPTURING APPARATUS AND IMAGE PROCESSING METHOD

(75) Inventors: Yuuichirou Kimijima, Yokohama (JP); Hideyuki Rengakuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/921,225

(22) PCT Filed: Mar. 10, 2009

(86) PCT No.: PCT/JP2009/054981
§ 371 (c)(1),
(2), (4) Date: Sep. 7, 2010

(87) PCT Pub. No.: WO2009/113701
PCT Pub. Date: Sep. 17, 2009

(65) Prior Publication Data
US 2011/0019028 A1    Jan. 27, 2011

(30) Foreign Application Priority Data

Mar. 11, 2008  (JP) ................................ 2008-061842
Feb. 25, 2009  (JP) ................................ 2009-043150

(51) Int. Cl.
*H04N 5/225* (2006.01)
*H04N 5/232* (2006.01)

(52) U.S. Cl.
USPC ........................................................ 348/345

(58) Field of Classification Search
USPC .............................. 348/222.1, 341, 345, 350
See application file for complete search history.

(56) References Cited

U.S. PATENT DOCUMENTS

| 6,829,008 | B1  | 12/2004 | Saga et al. |
| 7,715,703 | B2* | 5/2010  | Utagawa et al. ............. 396/111 |
| 8,009,223 | B2* | 8/2011  | Kusaka ........................ 348/350 |
| 8,013,921 | B2* | 9/2011  | Suzuki ......................... 348/308 |
| 8,218,962 | B2* | 7/2012  | Fujii et al. .................... 396/100 |
| 2004/0179128 | A1 | 9/2004 | Oikawa |

(Continued)

FOREIGN PATENT DOCUMENTS

| JP | 04-267211 A | 9/1992 |
| JP | 09-043507 A | 2/1997 |

(Continued)

OTHER PUBLICATIONS

English translation of JP 2007-189312 A Jul. 2007 Kusaka.*

(Continued)

*Primary Examiner* — James Hannett
(74) *Attorney, Agent, or Firm* — Fitzpatrick, Cella, Harper & Scinto

(57) ABSTRACT

An image capturing apparatus comprises an image sensor comprising an imaging pixel for receiving light through an opening with a center position coincident with the optical axis of a microlens, first and second focus detection pixels for receiving pupil-divided light through a first and second opening offset in first and second directions from the optical axis of a microlens, respectively; ROM for storing shading correction data; correction coefficient generation unit for generating shading correction coefficients respectively for the imaging pixel, and the first and second focus detection pixels from the shading correction data; and correction unit for subjecting a signal for the imaging pixel to shading correction with the use of the shading correction coefficient for the imaging pixel, and subjecting signals for the first and second focus detection pixels to shading correction with the use of the shading correction coefficients for the first and second focus detection pixels.

20 Claims, 15 Drawing Sheets

(56) References Cited

U.S. PATENT DOCUMENTS

| | | |
|---|---|---|
| 2005/0089241 A1 | 4/2005 | Kawanishi et al. |
| 2007/0102619 A1 | 5/2007 | Kusaka |
| 2009/0295964 A1* | 12/2009 | Utagawa et al. ............... 348/302 |

FOREIGN PATENT DOCUMENTS

| JP | 2000-041179 A | 2/2000 |
| JP | 2000-156823 A | 6/2000 |
| JP | 2000-324505 A | 11/2000 |
| JP | 2002-131623 A | 5/2002 |
| JP | 2005-102134 A | 4/2005 |
| JP | 2005-148091 A | 6/2005 |
| JP | 2005-303409 A | 10/2005 |
| JP | 3824237 B2 | 9/2006 |
| JP | 2007-189312 A * | 7/2007 |
| JP | 2007-293370 A | 11/2007 |

OTHER PUBLICATIONS

May 26, 2009 International Search Report and Written Opinion in PCT/JP2009/054981.
European search report dated Mar. 29, 2011, in corresponding European Patent Application No. 09720683.3-2202/2263374.

* cited by examiner

FIG. 15

| G | R | G | R | G | R | G | R | ⎫ ROWS OF NORMAL COLOR ARRANGEMENT |
|---|---|---|---|---|---|---|---|---|
| B | G | B | G | B | G | B | G | |
| G | R | G | R | G | R | G | R | ⎫ ROWS INCLUDING FIRST PHASE SENSORS |
| B | S1 | B | S1 | B | S1 | B | S1 | |
| G | R | G | R | G | R | G | R | ⎫ ROWS INCLUDING SECOND PHASE SENSORS |
| B | S2 | B | S2 | B | S2 | B | S2 | |
| G | R | G | R | G | R | G | R | ⎫ ROWS OF NORMAL COLOR ARRANGEMENT |
| B | G | B | G | B | G | B | G | |

IMAGE CAPTURING APPARATUS AND IMAGE PROCESSING METHOD

TECHNICAL FIELD

The present invention relates to an image capturing apparatus and an image processing method, and more particularly, relates to an image capturing apparatus for carrying out focusing control based on image signals obtained from an image sensor, and an image processing method for the image signals.

BACKGROUND ART

Some image capturing apparatuses, such as digital cameras and digital video cameras, are configured to have an autofocusing mechanism for automatically carrying out focus control of a photographing lens and automatically bringing a subject into an in-focus state. The autofocusing mechanism is classified into a distance measurement method and a focus state detection method in terms of the principle of the in-focus method used. In the distance measurement method, the distance to a subject is measured, and the lens position is controlled depending on the measured distance. In the focus state detection method, the focus is detected at an image pickup surface, and the lens position is controlled to an in-focus position. Typical focus state detection methods include a contrast detection method, a phase difference detection method, etc., and the principle of the focus state detection method is disclosed in Japanese Patent Laid-Open No. 4-267211, for example.

Now, the focus state detection method will be described with reference to FIG. 10A through FIG. 12B. For example, in an in-focus state, light $a_o$, $b_o$, and $c_o$ passing through respective portions of a photographing lens 1 is converged onto an image pickup surface m as shown in FIG. 10A to obtain an in-focus image $Z_0$ on the image pickup surface m as shown in FIG. 10B.

A so-called rear focused state is shown in FIGS. 11A and 11B, in which the focal position is shifted rearward from the in-focus state shown in FIGS. 10A and 10B. Light $a_1$, $b_1$, and $c_1$ passing through respective portions of the photographing lens 1 is converged behind the image pickup surface m as shown in FIG. 11A, thereby respectively resulting in separate images $Za_1$, $Zb_1$, and $Zc_1$ on the image pickup surface m as shown in FIG. 11B.

In addition, a so-called front focused state is shown in FIGS. 12A and 12B. Light $a_2$, $b_2$, and $c_2$ passing through respective portions of the photographing lens 1 is converged in front of the image pickup surface m as shown in FIG. 12A, thereby respectively resulting in separate images $Za_2$, $Zb_2$, and $Zc_2$ on the image pickup surface m as shown in FIG. 12B.

As can be seen from FIGS. 11A through 12B, the front focused state and the rear focused state are opposite to each other in the image defocus direction, and the defocus direction and defocus amount are referred to as a so-called defocus amount. Since the relation between the defocus amount and an amount of driving of the focus lens to an in-focus position is determined by the optical system, autofocus control can be carried out by moving the focus lens to the in-focus position.

The processing for calculation of the defocus amount in the phase difference detection method is disclosed in Japanese Patent Laid-Open No. 9-43507 as a known "MIN algorithm". FIG. 13 illustrates the internal configuration of a typical camera for detecting a correlation of phase differences by the MIN algorithm. Light incident from a lens is reflected downward of the camera by a sub-mirror mounted behind a main mirror mounted and inclined at 45 degrees. Then, the light is separated into two images by a secondary imaging lens to enter AF sensors, not shown. Then, the output data from these two AF sensors is loaded to obtain the correlation between the sensor outputs. Assuming that the respective sensor outputs are designated by a sensor 1 and a sensor 2, the data of the sensor 1 is designated by A[1] to 1[n], and the data of the sensor 2 is designated by B[1] to B[n], the correlation U0 is expressed by the following formula (1) (FIG. 14A).

$$U0 = \sum_{j=1}^{m} \min(A[j], B[j]) \tag{1}$$

(min(a,b) represents a smaller value of a and b)

First, U0 is calculated. Next, as shown in FIG. 14B, the correlation U1 between the data obtained by shifting an A image by just one bit of the AF sensor and the data of a B image is calculated. U1 is expressed by the following formula 2.

$$U1 = \sum_{j=1}^{m} \min(A[j+1], B[j]) \tag{2}$$

(min(a,b) represents a smaller value of a and b)

In this way, correlations obtained by shifting by one bit are calculated one after another. If the two images are coincident with each other, the correlation reaches a maximum (FIG. 14C). Thus, the shift amount and direction are obtained for the maximum value. This value corresponds to the defocus amount.

Meanwhile, Japanese Patent Laid-Open No. 2000-156823 discloses, as a device for implementing the phase difference detection method, an image sensor which has a filter color arrangement as shown in FIG. 15 and two-dimensionally arranged photoelectric conversion cells for converting optical images into electrical signals. As shown in FIG. 15, some of the photoelectric conversion cells are used as first phase sensors S1 and second phase sensors S2 for focus detection in accordance with the phase difference detection method, that is, for purposes other than the forming of image data. According to Japanese Patent Laid-Open No. 2000-156823, the imaging lens for the AF sensor, the secondary imaging lens for providing phase differences, etc., as shown in FIG. 13 are unnecessary, thereby allowing reduction in size of the image capturing apparatus and cost reduction.

Furthermore, Japanese Patent Laid-Open No. 2005-303409 discloses the shapes of focus detection pixels of image sensors. Japanese Patent Laid-Open No. 2005-303409 discloses an arrangement of image sensors as shown in FIG. 16, which includes a basic pixel arrangement referred to as Bayer arrangement of green pixels, red pixels, and blue pixels. The diagonally upper left to lower right pixels of the image sensor serve as pixels for focus detection. The other pixels serve as pixels for generating image data.

FIG. 17 is a diagram illustrating in detail some of the focus detection pixels of the image sensor shown in FIG. 16. This figure illustrates an enlarged view of four pixels composed of two focus detection pixels, one red pixel, and one blue pixel, for explaining the shapes of openings, where the upper left and lower right pixels correspond to the focus detection pixels (green pixels), the upper right pixel corresponds to the red pixel, and the lower left pixel corresponds to the blue pixel.

Reference numeral 11 denotes a microlens disposed on top of each opening. Reference numerals 37a and 37b denote center positions of the microlenses 11 in the adjacent focus detection pixels. Reference 36 denotes a line connecting the centers of the microlenses in in-line adjacent focus detection pixels. Reference numerals 38a and 38b each denote openings of the normal blue pixel and red pixel, other than the focus detection pixels. Reference numerals 39a and 39b denote openings of the focus detection pixels, which each have the shape obtained by reducing openings of the normal green pixels with reduction centers 35a and 35b as the centers, where the reduction centers 35a and 35b correspond to points obtained by moving the center positions 37a and 37b of the green pixels along the line 36 in opposite directions to each other, and the openings 39a and 39b of the focus detection have reduced shapes with the reduction centers 35a and 35b as the centers. Therefore, the openings 39a and 39b of the adjacent pixels are offset in different directions. Furthermore, the openings 39a and 39b are symmetrically shaped with respect to lines 46 perpendicular to the line 36.

Furthermore, in Japanese Patent Laid-Open No. 2002-131623, in the case of reading image data in an image sensor which has a plurality of photoelectric conversion units included in one pixel, the charges of the plurality of photoelectric conversion units are added and read out. Then, in the case of carrying out focus detection processing, the charges of the respective photoelectric conversion units are independently read out, and data corresponding to the read charges is used for focus detection processing in a phase difference detection method. In addition, focus detection with a high degree of accuracy is achieved by carrying out processing different from the image correction processing in the adding and reading processing as the image correction processing in the focus detection processing.

However, in Japanese Patent Laid-Open No. 2005-303409, the focus detection pixels of the image sensor are diagonally arranged from the upper left to the lower right of the image sensor, and have shapes and openings reduced more than those of the normal pixels with points offset from the centers of the microlens 11 as the centers. Therefore, the focus detection pixels are different from the normal pixels in aperture, and further different from the normal pixels in the amount of light obtained from the microlenses 11 due to the offset from the centers of the microlenses 11.

Japanese Patent Laid-Open No. 2000-41179 discloses a shading correction method for correcting shading characteristics of decrease in the amount of light input through an optical lens with distance from the optical axis of the lens. A ray of light incident through a photographing lens to an image sensor includes, in addition to components incident vertically with respect to the image pickup surface, a lot of light components for imaging from oblique directions. Circles of confusion of light collected by microlenses arranged at the image pickup surface for respective pixels are not always formed uniformly in center sections of each pixel of the image sensor but are shifted from the pixel centers depending on the positions of each pixel. Therefore, even in a case in which a plane with a uniform illuminance is photographed, the amount of light received is decreased in light receiving portions disposed in a peripheral section of the image pickup surface of the image sensor, comparing to light receiving portions in a center section of the image pickup surface around the optical axis of the photographing lens. As a result, luminance shading in which the brightness is rendered uneven depending on the positions in the image pickup surface resulting in distortion of the brightness is caused in photographing signals output from the image sensor, thereby resulting in decrease in image quality.

For example, Japanese Patent Laid-Open No. 2000-324505 discloses, as a correction method for shading correction, a method in which a plurality of pieces of shading correction data depending on the photographing state is prepared in advance as table values depending on the state of the optical system for carrying out luminance shading correction, and then an appropriately selected table value is used to carry out correction in an image processing unit for generating image data. However, if the shading correction data is provided for all of the pixels of the image sensor, the data size will be very large that requires a large capacity of the flash ROM or memory, thereby increasing the cost. Therefore, Japanese Patent No. 03824237 proposes a method of generating shading correction data by calculation using multiplication by gains determined depending on the distance from the center of the image sensor to each pixel. In a case in which the shading correction data is partially provided to obtain shading correction data for each pixel by calculation as described above, the same calculation method as that for normal pixels is not able to be applied to focus detection pixels due to the characteristics of microlenses of, and the shape of openings of, the image sensor.

Moreover, Japanese Patent Laid-Open No. 2005-303409 fails to describe luminance shading correction for focus detection pixels. When shading correction is carried out with the use of a shading coefficient optimized for normal pixels, for focus detection pixels which have a different aperture from the normal pixels and have an opening shape offset from the centers of the microlenses 11, the accuracy of calculation of the defocus amount for phase difference detection can be affected.

Furthermore, in Japanese Patent Laid-Open No. 2002-131623, only peak-level luminance shading is applied as luminance shading for normal pixels. By contrast, for focus detection pixels, peak-level luminance shading and dark-level luminance shading are applied to carry out shading correction for rendering the distribution of the amount of light more uniform with a higher degree of accuracy, as compared with the normal pixels. However, when the different shading corrections are carried out for the normal pixels and the focus detection pixels as described above, generation of image data and processing for calculating the defocus amount are not able to be carried out at the same time. Therefore, this method has a problem that a relatively long period of time is required until the defocus amount is calculated.

DISCLOSURE OF INVENTION

The present invention has been made in consideration of the above situation, and has as its object to enable focus detection with a higher degree of accuracy to be carried out with the use of focus detection pixels that receive pupil-divided light through openings that are offset from the optical axes of microlenses.

According to the present invention, the foregoing object is attained by providing an image capturing apparatus comprising: an image sensor for collecting via a microlens light incident through an optical system to capture an image, and comprising an imaging pixel for receiving light through an opening with a center position coincident with the optical axis of a microlens, a first focus detection pixel for receiving pupil-divided light through a first opening offset in a first direction from the optical axis of a microlens, and a second focus detection pixel for receiving pupil-divided light through a second opening offset in a second direction different from the first direction from the optical axis of a microlens; storage means for storing correction data for carrying out shading correction; correction coefficient generation means for generating a shading correction coefficient for the imaging pixel and shading correction coefficients for the first and second focus detection pixels from correction data stored in the storage means; and correction means for subjecting a signal of the imaging pixel to shading correction with the use of the shading correction coefficient for the imaging pixel, and subjecting signals of the first and second focus detection pixels to shading correction with the use of the shading correction coefficients for the first and second focus detection pixels.

According to the present invention, the foregoing object is also attained by providing an image processing method for pixel signals output from an image sensor for collecting via a microlens light incident through an optical system to capture an image, the image sensor comprising an imaging pixel for receiving light through an opening with a center position coincident with the optical axis of a microlens, a first focus detection pixel for receiving pupil-divided light through a first opening offset in a first direction from the optical axis of a microlens, and a second focus detection pixel for receiving pupil-divided light through a second opening offset in a second direction different from the first direction from the optical axis of a microlens, the method comprising: a step of reading out from storage means correction data for the imaging pixel for carrying out shading correction of the imaging pixel, or correction data for focus detection pixels for carrying out shading correction of the first and second focus correction pixels, which is stored in the storage means in advance, depending on a pixel intended for shading correction; a correction coefficient generation step of generating a shading correction coefficient for the imaging pixel or shading correction coefficients for the first and second focus detection pixels from the correction data read out from the storage means, depending on the pixel intended for shading correction; and a correct-ion step of subjecting a signal of the imaging pixel to shading correction with the use of the shading correction coefficient for the imaging pixel, and subjecting signals of the first and second focus detection pixels to shading correction with the use of the shading correction coefficients for the first and second focus detection pixels.

Further features of the present invention will become apparent from the following description of exemplary embodiments (with reference to the attached drawings).

BRIEF DESCRIPTION OF DRAWINGS

FIG. 15 is a diagram illustrating the configuration of an image sensor for carrying out a phase difference detection method;

BEST MODE FOR CARRYING OUT THE INVENTION

Preferred embodiments of the present invention will be described in detail in accordance with the accompanying drawings.

(First Embodiment)

Figure 1:
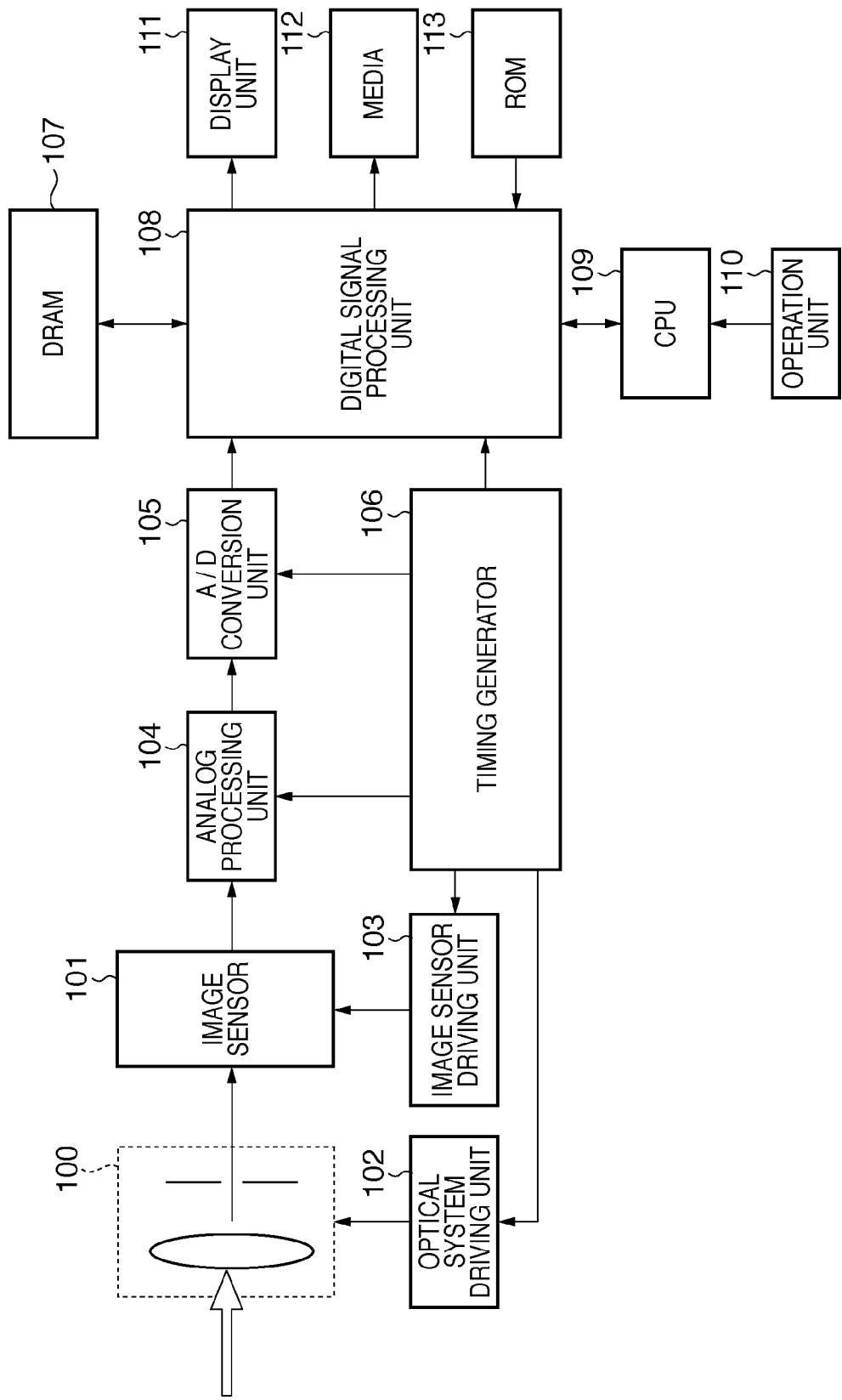
FIG. 1 is a block diagram schematically illustrating the functional configuration of a digital still camera according to first to fourth embodiments of the present invention.

FIG. 1 is a block diagram schematically illustrating an example of the functional configuration of a typical digital still camera according to a first preferred embodiment of the present invention.

Reference numeral 100 denotes an optical system for capturing a subject image, which includes a photographing lens, a shutter, an aperture, etc. Furthermore, the photographing lens in the present embodiment is equipped with a zoom lens with a variable focal length. Reference numeral 101 denotes an image sensor, which is composed of, for example, CCDs (Charge Coupled Devices), CMOS sensors, or the like. Further, in the first embodiment, the image sensor 101 is composed of normal pixels (imaging pixels) intended to generate image data and focus detection pixels for use in focus detection. Reference numeral 102 denotes an optical system driving unit composed of an actuator for driving the optical system, which, for example, drives a lens of the optical system 100 during autofocusing. Reference numeral 103 denotes an image sensor driving unit, which generates horizontal and vertical transfer driving signals when the image sensor 101 is composed of, for example, CCDs or CMOS sensors.

Reference numeral 104 denotes an analog processing unit, which carries out correlated double sampling, not shown, for removing reset noises contained in input image signals, and gain variable amplification for amplifying the level of image signals by varying the gain. Reference numeral 105 denotes an A/D conversion unit for quantizing analog data output from the analog processing unit 104 into digital data. Reference numeral 108 denotes a digital signal processing unit for applying image processing to digital data output from the A/D conversion unit 105. Typically, the digital signal processing unit 108 carries out white balance adjustment, gain adjustment, filtering, interpolation processing, etc., resines the digital data to an appropriate image size, compresses the data, and records the compressed data on a media 112. Alternatively, the digital signal processing unit 108 carries out processing for display on an LCD or the like of a display unit 111. Furthermore, in the present embodiment, the digital signal processing unit 108 carries out shading correction processing.

Reference numeral 106 denotes a timing generator for generating and transmitting timing signals to the optical system driving unit 102, the image sensor driving unit 103, the analog processing unit 104, the A/D conversion unit 105, and the digital signal processing unit 108. Reference numeral 107 denotes an external memory for buffering intermediate data in the process performed by the digital signal processing unit 108. Reference numeral 109 denotes a CPU for controlling the entire camera. Reference numeral 110 denotes an operation unit such as a switch operated by a user to control the camera. Reference numeral 113 denotes a ROM with instructions from the CPU 109, etc., stored therein. In the present embodiment, the ROM 113 stores shading correction data for carrying out shading correction.

Figure 2:
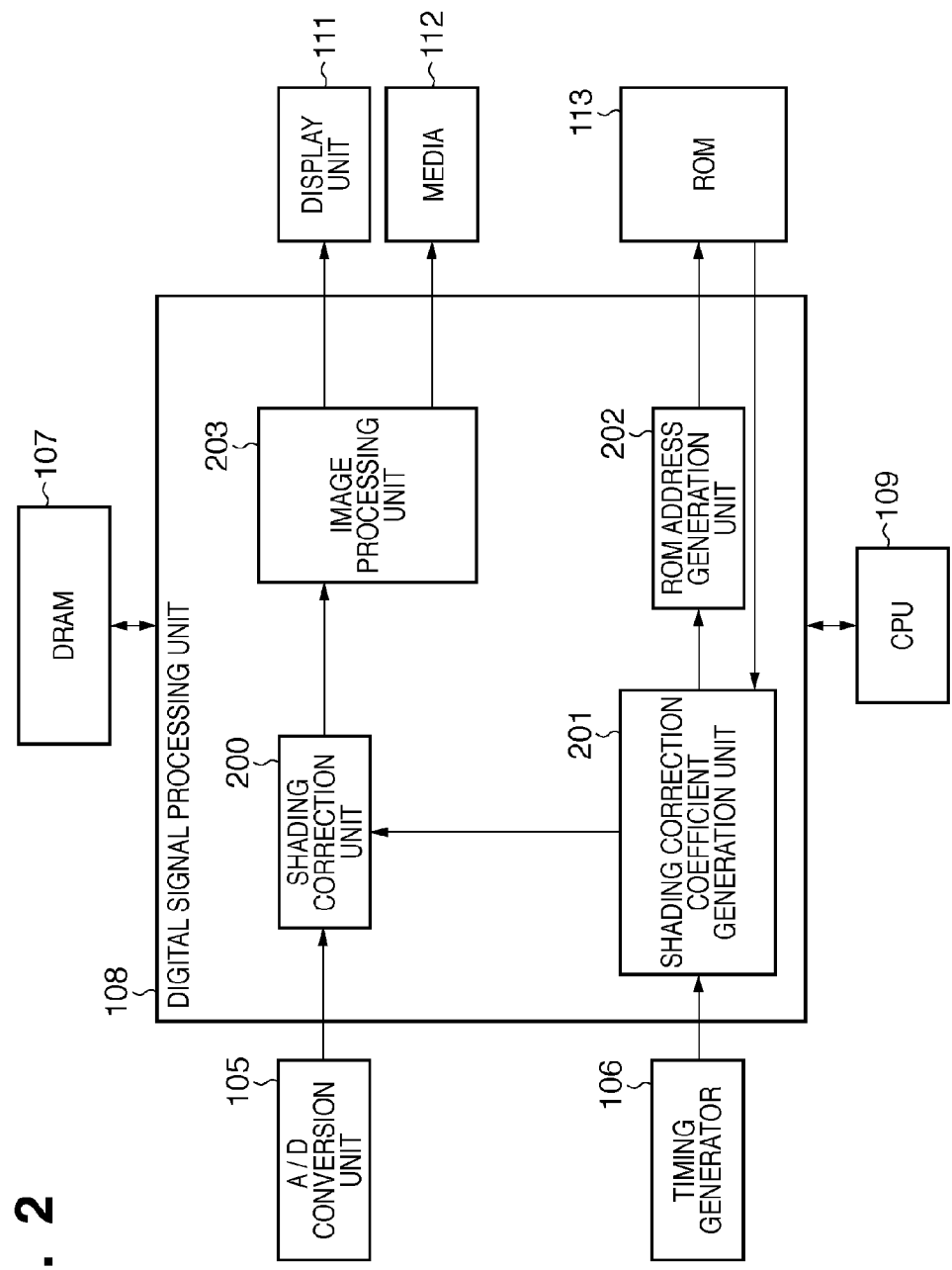
FIG. 2 is a block diagram illustrating the detailed configuration of a digital signal processing unit according to the first, second, and fourth embodiments of the present invention.

FIG. 2 is a block diagram illustrating in detail some functions of the digital signal processing unit 108 in FIG. 1, for explaining operation of shading correction process.

Reference numeral 200 denotes a shading correction unit for carrying out shading correction. The shading correction unit 200 carries out calculation for shading correction, for image data read out from the normal pixels or signals for focus detection (focus detection data) read out from the focus detection pixels on the image sensor 101 and input from the A/D conversion unit 105. Reference numeral 201 denotes a shading correction coefficient generation unit, which determines the position of a pixel of the image sensor 101 from a timing signal from the timing generator 106, and generates a request signal for reading out shading correction data to a ROM address generation unit 202 described below. The request signal is transmitted as a signal that is able to determine whether shading correction data read out from the ROM 113 is intended for the normal pixels (photographing pixels) or the focus detection pixels. The shading correction coefficient generation unit 201, in the case of the normal pixels, calculates a shading correction coefficient for each pixel from the shading correction data read out from the ROM 113, and transmits the shading correction coefficients to the shading correction unit 200. On the other hand, in the case of the focus detection pixels, the shading correction coefficient generation unit 201 transmits the read shading correction data as shading correction coefficients directly to the shading correction unit 200 without carrying out the calculation. Reference numeral 202 denotes the ROM address generation unit. The ROM address generation unit 202 determines, from the request signal generated by the shading correction coefficient generation unit 201, whether data input into the shading correction unit 200 is intended for the normal pixels or the focus detection pixels, and reads out appropriate shading correction data from the ROM 113.

Reference numeral 203 denotes an image processing unit for carrying out digital signal processing other than the shading correction processing. The processing carried out in the image processing unit 203 includes phase difference detection processing in which, for focus detection data subjected to shading correction, the maximum value of correlation calculated by "MIN algorithm" is obtained for each of pixels of different pupil positions, an A pixel and a B pixel. However, the phase difference detection processing may be carried out by the CPU 109. The defocus amount obtained by the phase difference detection processing is transmitted by the CPU 109 to the optical system driving unit 102 to drive the zoom lens with autofocusing function in the optical system 100.

Figure 3:
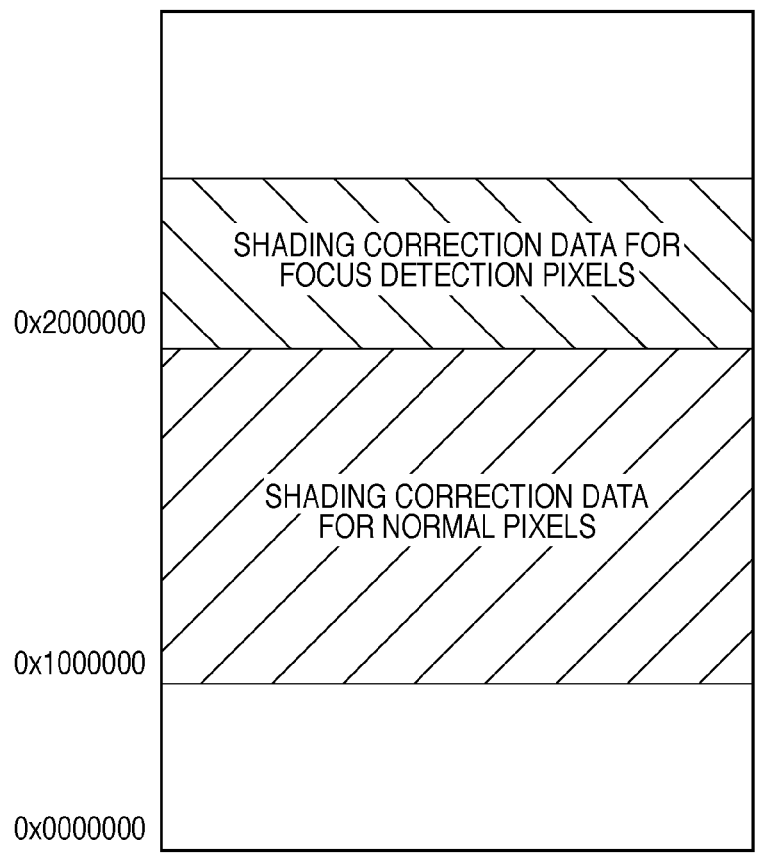
FIG. 3 is a diagram illustrating the memory structure of a ROM according to the first embodiment of the present invention.

FIG. 3 is a diagram illustrating a memory map for specifying only shading correction data in the ROM 113. In the first embodiment, for physical addresses of the ROM 113, the shading correction data for the normal pixels is stored in addresses from 0x1000000 to 0x1EFFFFF. Further, the shading correction data for the focus detection pixels is stored in addresses from 0x2000000 to 0x200FFFF. The shading correction data read for the addresses, for use in the normal pixels, is data intended for a portion of the image sensor 101, and the shading correction coefficient for each pixel is calculated in the shading correction coefficient generation unit. On the other hand, for each of the focus detection pixels there is held data as the shading correction coefficient.

The ROM address generation unit 202 issues the address of 0x1000000 to the ROM 113 in a case in which a request signal generated by the shading correction coefficient generation unit 201 is determined for a normal pixel. The shading correction data for the normal pixel, which has been read from the ROM 113, is used to calculate a shading correction coefficient in the shading correction coefficient generation unit 201. The shading correction coefficient is then transmitted to the shading correction unit 200, and shading correction is applied to image data of the normal pixel input from the A/D conversion unit 105.

When the timing generator 106 transmits the next timing signal to the digital signal processing unit 108, the shading correction coefficient generation unit 201 generates a request signal from the address of the next image sensor position, and transmits the request signal to the ROM address generation unit 202. When this request signal is determined to be for a focus detection pixel, the ROM address generation unit 202 stores the address value of the previous normal pixel, and issues the address of 0x2000000 for the focus detection pixel to the ROM 113. The shading correction data for the focus detection pixel, which has been read from the ROM 113, is transmitted as a shading correction coefficient from the shading correction coefficient generation unit 201 directly to the shading correction unit 200, and shading correction is applied to focus detection data of the focus detection pixel input from the A/D conversion unit 105.

By contrast, if the address value of the image sensor position at the next timing signal is determined to be for a normal pixel, the ROM address generation unit 202 stores the address value of the previous focus detection pixel. Then, 1 is added to the stored address value to obtain the address value of the next normal pixel, and the address 0x1000001 is issued to the ROM 113. Similarly, in a case in which the next timing signal is determined to be for the focus detection pixel, the address value 0x1000001 of the previous normal pixel is stored, and the address 0x2000001, which is an address value obtained by adding 1 to the address value of the previous focus detection pixel, is issued to the ROM 113.

Figure 4:
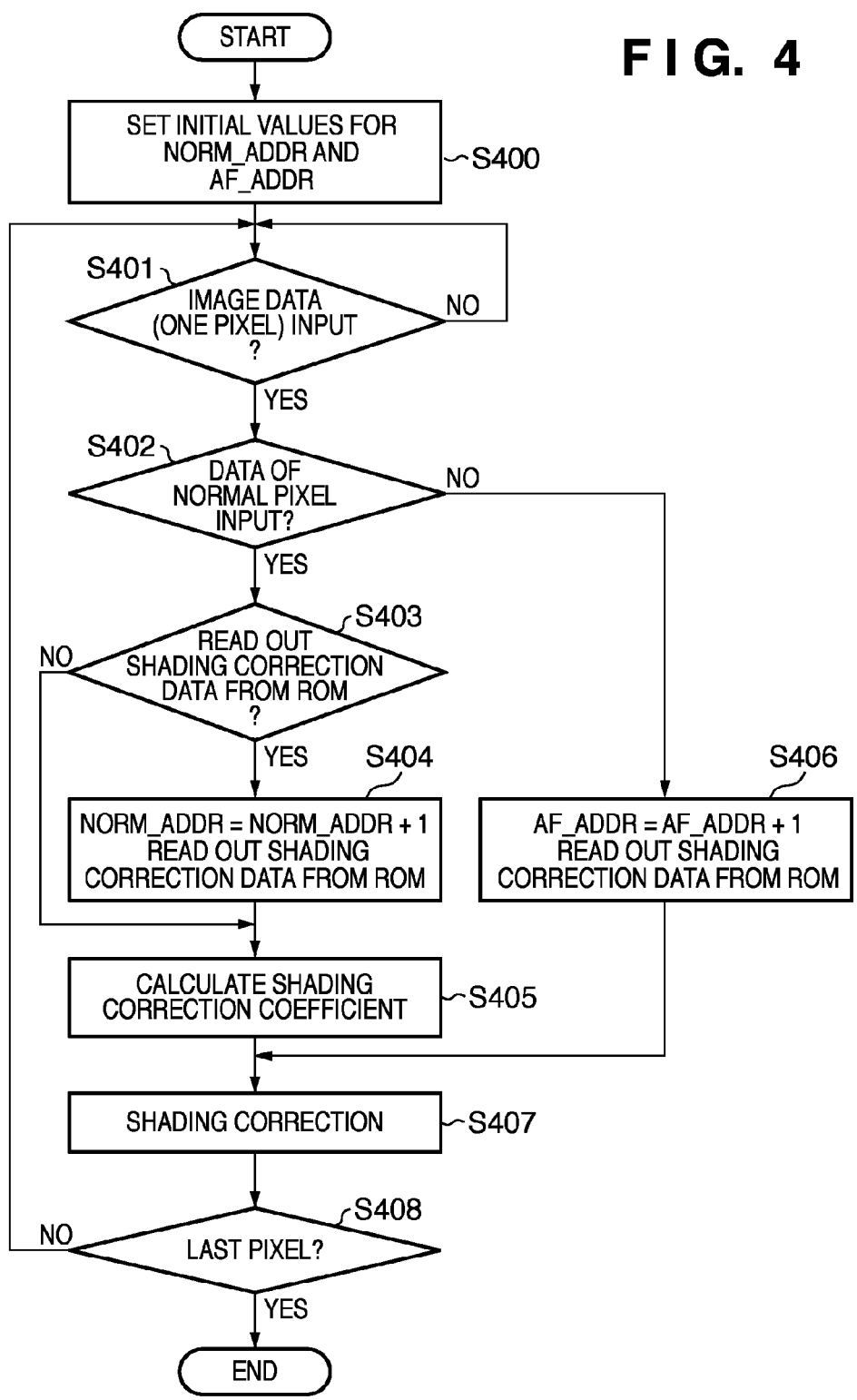
FIG. 4 is a flowchart for explaining a shading correction processing according to the first embodiment of the present invention.

Next, shading correction processing in the first embodiment will be described with reference to a flowchart of FIG. 4. It is to be noted that in FIG. 4, the term NORM_ADDR refers to an address value of the ROM 113 with shading correction data stored therein for a normal pixel that is next subjected to processing in the shading correction unit 200 of the digital signal processing unit 108, the term AF_ADDR refers to an address value of the ROM 113 with shading correction data stored therein for a focus detection pixel that is next subjected to processing in the shading correction unit 200 of the digital signal processing unit 108, and the term ROM_ADDR refers to an actual address value output to the ROM 113.

In step S400, initial values are assigned to the NORM_ADDR and the AF_ADDR. In the memory map example of FIG. 3, the address 0x1000000 and the address 0x2000000 are respectively assigned to the NORM_ADDR and the AF_ADDR.

In step S401, it is determined if image data (of one pixel) is input. When it is determined that the image data is input in step S401 ("YES" in step S401), the processing proceeds to step S402.

In step S402, it is determined if the input image data is image data of a normal pixel or focus detection data of a focus detection pixel.

When it is determined that the image data is of a normal pixel in step S402 ("YES" in step S402), it is determined in step S403 whether shading correction data is to be read out from the ROM 113.

When in step S403 it is determined that shading correction data is to be read out from the ROM 113, the processing moves to step S404. In step S404, the normal pixel address NORM_ADDR is increased by 1, and an address value obtained by increasing the normal pixel address NORM_ADDR by 1 is set as the ROM_ADDR. Then, based on the ROM_ADDR, shading correction data for the normal pixel is read out from the ROM 113.

On the other hand, when it is determined in step S403 that no shading correction data is to be read out from the ROM 113, the processing proceeds directly to step S405 without reading out shading correction data form the ROM 113.

In step S405, in a case in which the shading correction data for the normal pixel is read out from the ROM 113 in step S404, a shading correction coefficient is calculated from the read shading correction data for the normal pixel. In a case in which the shading correction data is not read out from the ROM 113, the shading correction coefficient is calculated based on the shading correction data for the normal pixel read out up to then and on the position of the normal pixel.

On the other hand, when it is determined that the image data is of a focus detection pixel in step S402 ("NO" in step S402), the processing proceeds to step S406. In step S406, the focus detection pixel address AF_ADDR is increased by 1, and an address value obtained by increasing the focus detection pixel address AF_ADDR by 1 is set as the ROM_ADDR. Then, based on the ROM_ADDR, shading correction data for the focus detection pixel is read out from the ROM 113, and the processing proceeds to step S407.

In step S407, in the case of the normal pixel, shading correction is carried out in accordance with the shading correction coefficient calculated in step S405. Alternatively, in the case of the focus detection pixel, shading correction is carried out in accordance with the shading correction data for the focus detection pixel (shading correction coefficient) read out from the ROM 113.

In step S408, it is determined if the image data subjected to the shading correction processing in step S407 corresponds to the last pixel read out from the image sensor 101. If the image data corresponds to the last pixel ("YES" in step S408), the processing is completed. If not ("NO" in step S408), the processing returns to step S401, and again moves to determining if the next image data is input.

In the first embodiment, it is possible to carry out focus detection with a high degree of accuracy by carrying out appropriate shading correction for the focus detection pixels. Furthermore, it is possible to speed up focus detection since generation of normal image data and generation of data for focus detection can be processed in a period for which the image sensor is read out once.

It is to be noted that the shading correction coefficient is calculated from the shading correction data in step S405 in the case of the normal pixels in the first embodiment. However, the shading correction coefficient may be used as-is without calculation as long as the system can store in the ROM 113 the shading correction coefficient for all of the normal pixels.

(Second Embodiment)

Figure 16:
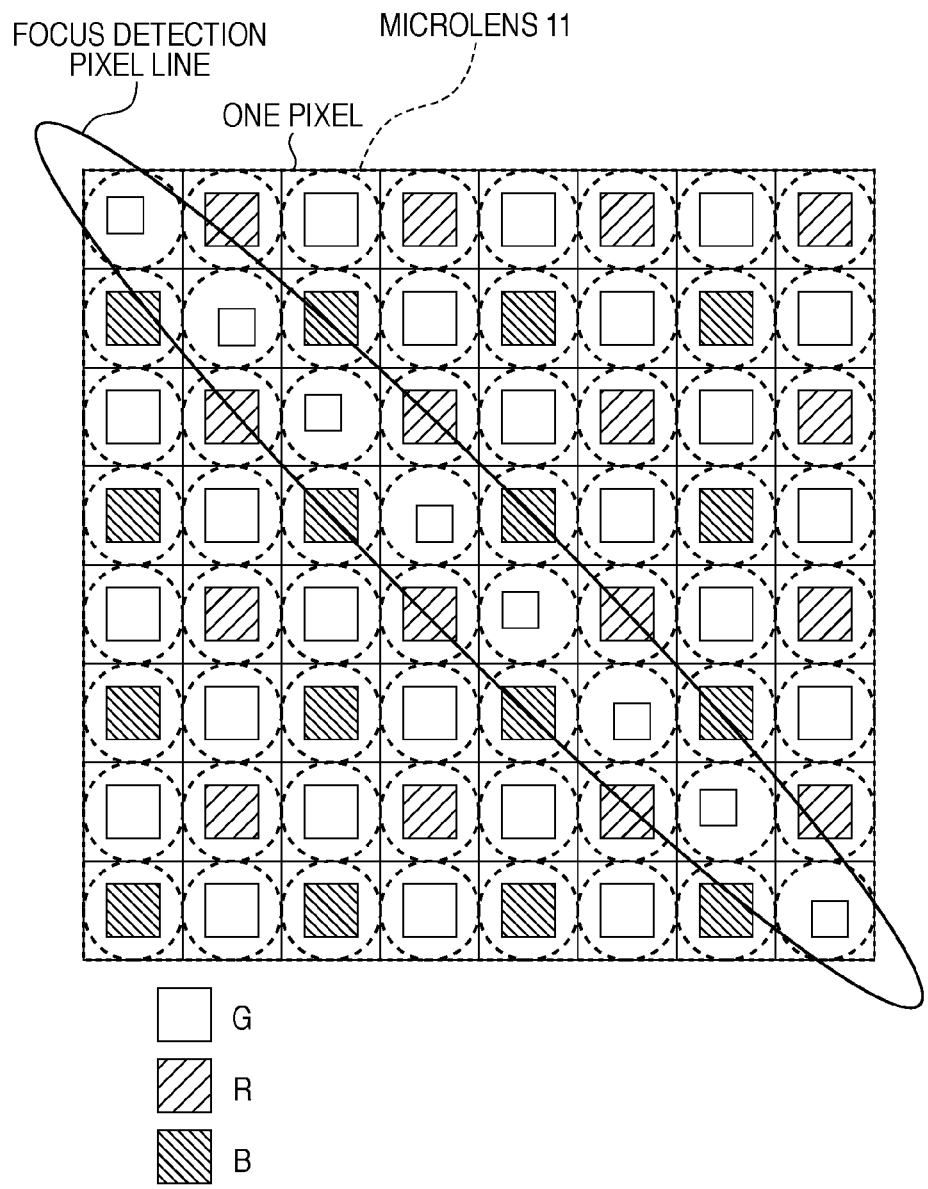
FIG. 16 is a diagram illustrating the shape of focus detection pixels of an image sensor.
Figure 17:
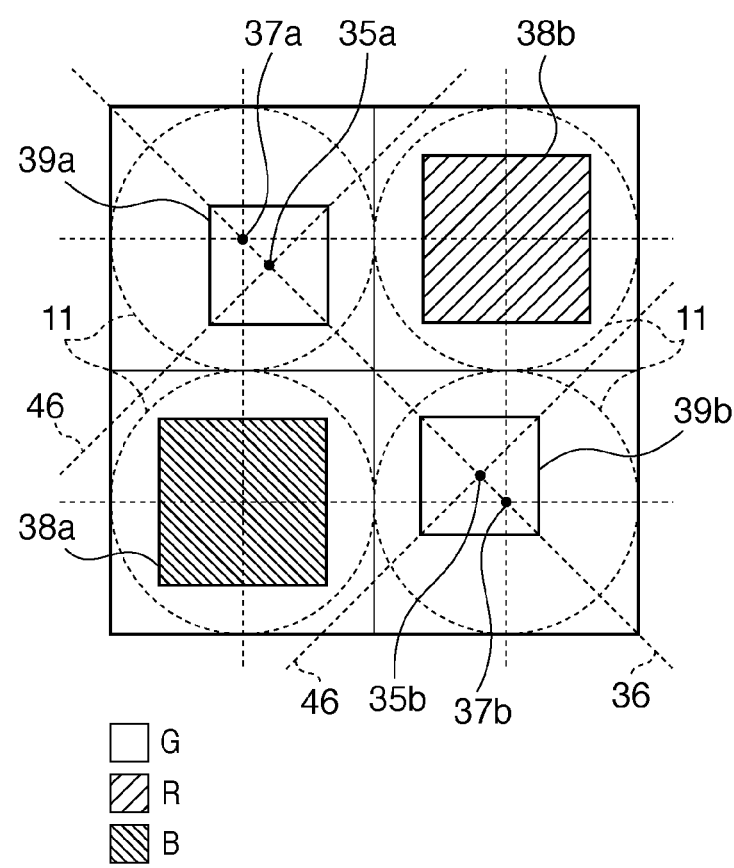
FIG. 17 is a diagram illustrating in detail some of the focus detection pixels of the image sensor shown in FIG. 16.

FIG. 16 shows an arrangement of an image sensor of normal pixels and focus detection pixels in a second embodiment. An enlarged view of a portion of the arrangement is shown in FIG. 17. The upper left and lower right pixels in FIG. 17 are focus detection pixels. The center of microlenses 11 and the center of the opening of the normal pixels matches, while the center of the opening of the upper left pixel is offset downward and rightward as a first direction, and the center of the opening of the lower right pixel is offset upward and leftward as a second direction. The pixels each are focus detection pixels with different pupil positions as viewed from the optical system, where the upper left focus detection pixel is referred to as an A pixel, whereas the lower right focus detection pixel is referred to as a B pixel. Separate shading correction data is provided for each of the focus detection pixel, the A pixel and the B pixel.

The camera in the second embodiment has the same configuration as that shown in FIGS. 1 and 2 of the first embodiment described above. The second embodiment is different from the first embodiment in that shading correction data for the focus detection pixels to be stored in the ROM 113 is separately provided for the A pixel and the B pixel.

Figure 5:
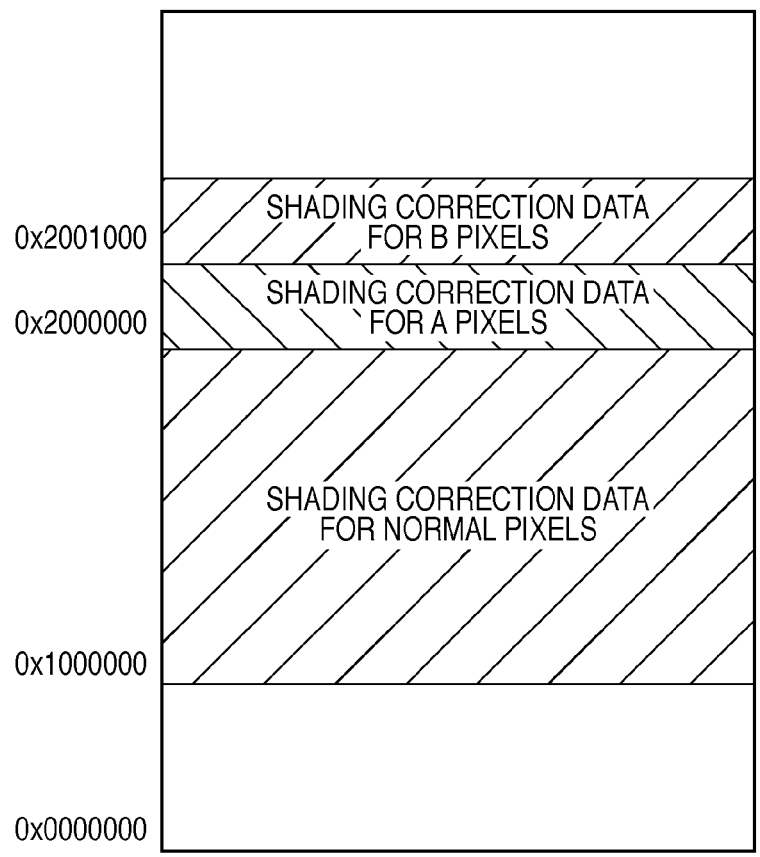
FIG. 5 is a diagram illustrating the memory structure of a ROM according to the second preferred embodiment of the present invention.

FIG. 5 is a diagram illustrating a memory map for specifying only shading correction data in the ROM 113. In the second embodiment, for physical addresses of the ROM 113, the shading correction data for the normal pixels is arranged in addresses from 0x1000000 to 0x1FFFFFF. The shading correction data for the A pixels as focus detection pixels is arranged in addresses from 0x2000000 to 0x2000FFF. The shading correction data for the B pixels as focus detection pixels is arranged in addresses from 0x2001000 to 0x2001FFF.

Figure 6:
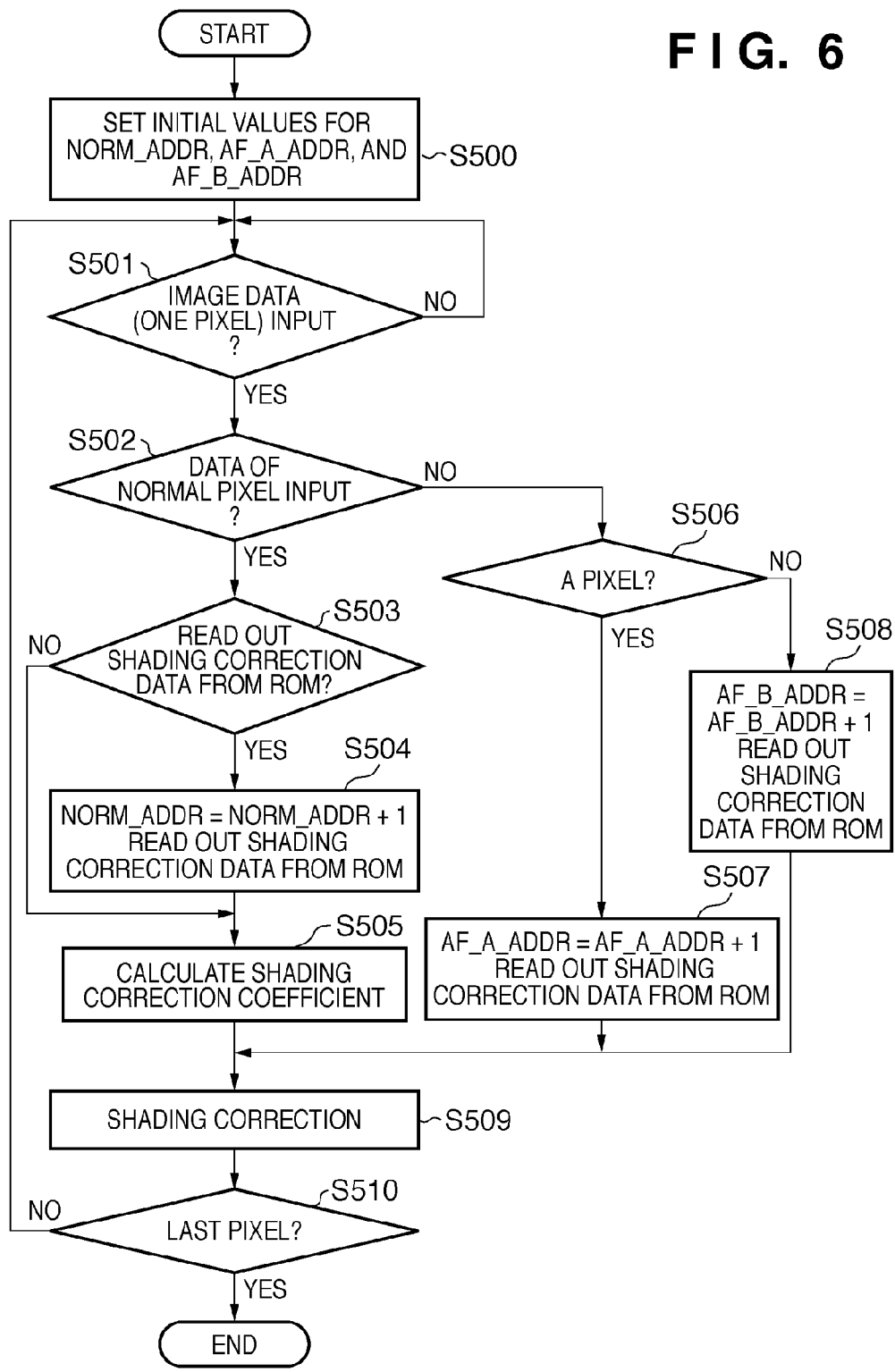
FIG. 6 is a flowchart for explaining a shading correction processing according to the second embodiment of the present invention.

Next, shading correction processing in the second embodiment is described with reference to a flowchart of FIG. 6. It is to be noted that in FIG. 6, the term NORM_ADDR refers to an address value of the ROM 113 with shading correction data stored therein for a normal pixel that is next subjected to processing in the shading correction unit 200 of the digital signal processing unit 108, the term AF_A_ADDR refers to an address value of the ROM 113 with shading correction data stored therein for the A pixel as a focus detection pixel that is next subjected to processing in the shading correction unit 200 of the digital signal processing unit 108, the term AF_B_ADDR refers to an address value of the ROM 113 with shading correction data stored therein for the B pixel as a focus detection pixel that is next subjected to processing in the shading correction unit 200 of the digital signal processing unit 108, and the term ROM_ADDR refers to an actual address value output to the ROM 113.

In step S500, initial values are set for the NORM_ADDR, the AF_A_ADDR, and the AF_B_ADDR. In the memory map example of the ROM 113 in FIG. 5, the address 0x1000000, the address 0x2000000, and the address 0x2001000 are respectively assigned to the NORM_ADDR, the AF_A_ADDR, and the AF_B_ADDR.

In step S501, it is determined if image data (of one pixel) is input. When it is determined that pixel data is input ("YES" in step S501), the processing proceeds to step S502.

In step S502, it is determined if the input image data is image data of a normal pixel or focus detection data of a focus detection pixel.

When it is determined that the image data is of a normal pixel in step S502 ("YES" in step S502), it is determined in step S503 whether shading correction data is to be read out from the ROM 113.

When it is determined in step S503 that shading correction data is to be read out from the ROM 113 ("YES" in step S503), the processing moves to step S504. In step S504, the normal pixel address NORM_ADDR is increased by 1, and an address value obtained by increasing the normal pixel address NORM_ADDR by 1 is set as the ROM_ADDR. Then, based on the ROM_ADDR, shading correction data for the normal pixel is read out from the ROM 113.

In step S505, the shading correction coefficient for each pixel is calculated from the shading correction data for the normal pixel which has been read from the ROM 113.

On the other hand, when it is determined that the image data is of a focus detection pixel in step S502, the processing proceeds to step S506 and it is determined if the focus detection pixel is an A pixel. In a case in which it is determined that the focus detection pixel is an A pixel, the processing proceeds to step S507 and the A pixel address AF_A_ADDR is increased by 1, and an address value obtained by increasing the A pixel address AF_A_ADDR by 1 is set as the ROM_ADDR. On the other hand, in a case in which it is determined in step S506 that the focus detection pixel is an B pixel, the processing proceeds to step S508 and the B pixel address AF_B_ADDR is increased by 1, and an address value obtained by increasing the B pixel address AF_B_ADDR by 1 is set as the ROM_ADDR. Then, in step S507 or S508, based on the ROM_ADDR, shading correction data for the A pixel or the B pixel is read out from the ROM 113.

In step S509, in the case of the normal pixel, shading correction is carried out in accordance with the shading correction coefficient calculated in step S505. Alternatively, in the case of the A pixel or the B pixel as a focus detection pixel, shading correction is carried out in accordance with the shading correction data for the focus detection pixel which has been read out from the ROM 113.

In step S510, it is determined if the image data subjected to the shading correction processing in step S509 corresponds to the last pixel read out from the image sensor 101. If the image data corresponds to the last pixel ("YES" in step S510), the processing is completed. If not ("NO" in step S510), the processing returns to step S501, and again moves to determining if the next image data is input.

(Third Embodiment)

The third embodiment provides, as compared to the first embodiment, a method in which shading correction data for focus detection is calculated from shading correction data for a normal pixel. The camera according to the third embodiment has the same configuration as that in FIG. 1 of the first embodiment.

Figure 7:
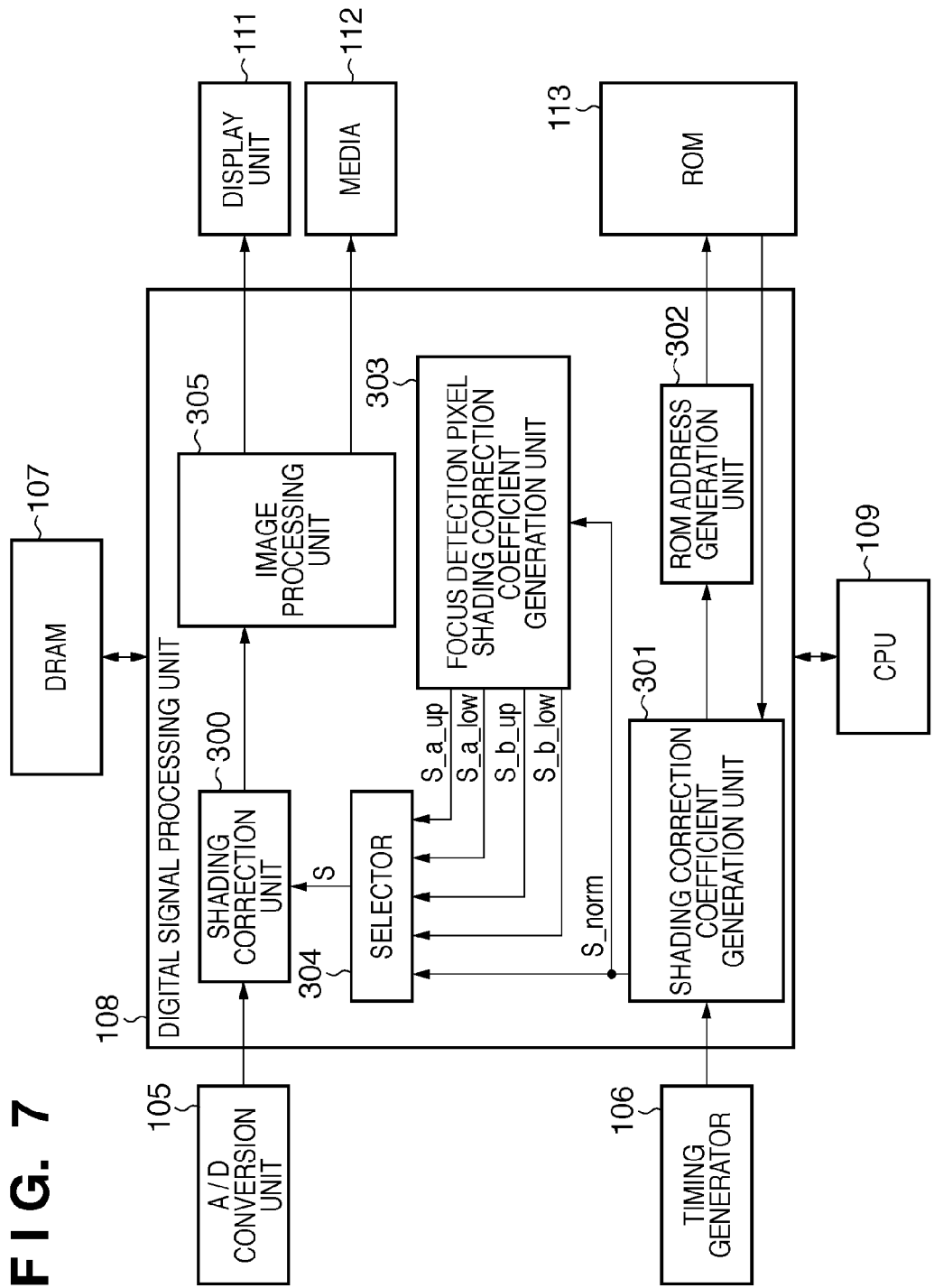
FIG. 7 is a block diagram illustrating the detailed configuration of a digital signal processing unit according to the third embodiment of the present invention.

FIG. 7 is a block diagram illustrating in detail some functions of a digital signal processing unit 108 in the third embodiment. Processing is described below with reference to FIG. 7, in which a shading correction coefficient for a focus detection pixel is calculated from shading correction data for a normal pixel.

Reference numeral 300 denotes a shading correction unit for carrying out shading correction. The shading correction unit 300 carries out calculation for shading correction, for image data read out from the normal pixels or signals for focus detection (focus detection data) read out from the focus detection pixels on the image sensor 101 and input from an A/D conversion unit 105. Reference numeral 301 denotes a shading correction coefficient generation unit, which determines the position of a pixel of the image sensor 101 from a timing signal from a timing generator 106, and then generates a request signal for reading out shading correction data to a ROM address generation unit 302 described below. The request signal is transmitted as a signal indicating that all of shading correction data read from the ROM 113 is intended for normal pixels.

Reference numeral 302 denotes the ROM address generation unit. The ROM address generation unit 302 reads out shading correction data from the ROM 113, based on the request signal generated by the shading correction coefficient generation unit 301. The shading correction data for addresses read out at this point includes only data for some pixels of the image sensor 101. In addition, the read shading correction data corresponds to shading correction data for normal pixels. Accordingly, even if the image data input from the A/D conversion unit 105 is data from a focus detection pixel, shading correction data optimized for a normal pixel will be read out from the ROM 113.

The shading correction coefficient generation unit 301 calculates a shading correction coefficient S_norm for a normal pixel from the shading correction data read out from the ROM 113, and transmits the shading correction coefficient S_norm to a focus detection pixel shading correction coefficient generation unit 303 and a selector 304. Then, the shading correction coefficient for each pixel is calculated in the shading correction coefficient generation unit 301 and the focus detection pixel shading correction coefficient generation unit 303.

Reference numeral 303 denotes the focus detection pixel shading correction coefficient generation unit for generating a shading correction coefficient for a focus detection pixel from the shading correction coefficient S_norm for the normal pixel. The focus detection pixel shading correction coefficient generation unit 303 can generate four types of shading correction data, S_a_up, S_a_low, S_b_up, and S_b_low. Reference numeral 304 denotes the selector for selecting as a selection signal an address value output by the shading correction coefficient generation unit 301 from the five types of shading correction coefficients S_norm, S_a_up, S_a_low, S_b_up, and S_b_low. Reference numeral 305 denotes an image processing unit for carrying out digital signal processing other then the shading correction processing.

A method in the third embodiment is described, for calculating a shading correction coefficient for a focus detection pixel from a shading correction coefficient for a normal pixel by the focus detection pixel shading correction coefficient generation unit 303. In the third embodiment, as in the second embodiment, the image sensor in FIG. 16 is used, and an enlarged view of a portion of the image sensor is as shown in FIG. 17. In FIG. 17, the upper left pixel and the lower right pixel are respectively referred to as an A pixel and a B pixel. Details of the pixels are described in the second embodiment, and are thus omitted here. Luminance shading in a general digital camera has shading characteristics of decrease in the amount of light with distance from the optical axis of a photographing lens. As for the A pixel, the upper left pixel with respect to the center of the image sensor 101 in FIG. 16 has an opening offset in the direction toward the optical axis of a photographing lens. On the other hand, the lower right A pixel has an opening apart from the optical axis of a photographing lens. Furthermore, as for the B pixel, the upper left pixel with respect to the center of the image sensor 101 in FIG. 16 has an opening apart from the optical axis of a photographing lens.

On the other hand, the lower right B pixel has an opening offset in the direction toward the optical axis of a photographing lens.

Accordingly, in the third embodiment, when a shading correction coefficient for a focus detection pixel is obtained, the method for calculating the shading correction coefficient for the focus detection pixel is varied depending on the type of pixel, that is, whether it is a pixel offset toward the center of a photographing lens or a pixel apart from the center.

Furthermore, the normal pixels on the one hand, and the focus detection pixels as the A pixels and the B pixels on the other, are different from each other in the aperture of the opening of the image sensor 101. The aperture of the focus detection pixel is smaller than that of the normal pixel. Therefore, in the third embodiment, for calculating a shading correction coefficient for a focus detection pixel, a shading correction coefficient for a normal pixel is multiplied by the ratio of the aperture of the focus detection pixel to the aperture of the normal pixel.

Here, the opening of the normal pixel is represented by α, whereas the aperture of the focus detection pixels (both the A pixel and the B pixel) is represented by β. In addition, a coefficient value applied to a focus detection pixel offset toward the optical axis of the photographing lens is represented by m, whereas a coefficient value applied to a focus detection pixel apart from the optical axis of the photographing lens is represented by n. Further, a shading correction coefficient for the upper left A pixel with respect to the optical axis of the photographing lens is represented by S_a_up, whereas a shading correction coefficient for the upper left B pixel with respect to the center of the lens is represented by S_b_up. Furthermore, a shading correction coefficient for the lower right A pixel with respect to the optical axis of the lens is represented by S_a_low, whereas a shading correction coefficient for the lower right B pixel with respect to the center of the lens is represented by S_b_low. Then, the shading correction coefficients are expressed by the following formula.

$$S\_a\_up = S\_norm \times (\alpha/\beta) \times m$$

$$S\_a\_low = S\_norm \times (\alpha/\beta) \times n$$

$$S\_b\_up = S\_norm \times (\alpha/\beta) \times n$$

$$S\_b\_low = S\_norm \times (\alpha/\beta) \times m$$

In the third embodiment, the A pixels and the B pixels are assumed to have the same aperture. However, if the A pixel and the B pixel have openings of different shapes, the aperture β for the focus detection pixel may be independently provided for each of the A pixel and the B pixel. In a similar way, the coefficient m or n may be separately provided for the A pixel and the B pixel.

Further, in the third embodiment, the shading correction coefficient for the focus detection pixel is obtained by the focus detection pixel shading correction coefficient generation unit 303. However, the shading correction coefficient for the focus detection pixel may be calculated by the CPU 109 in FIG. 7.

Figure 8:
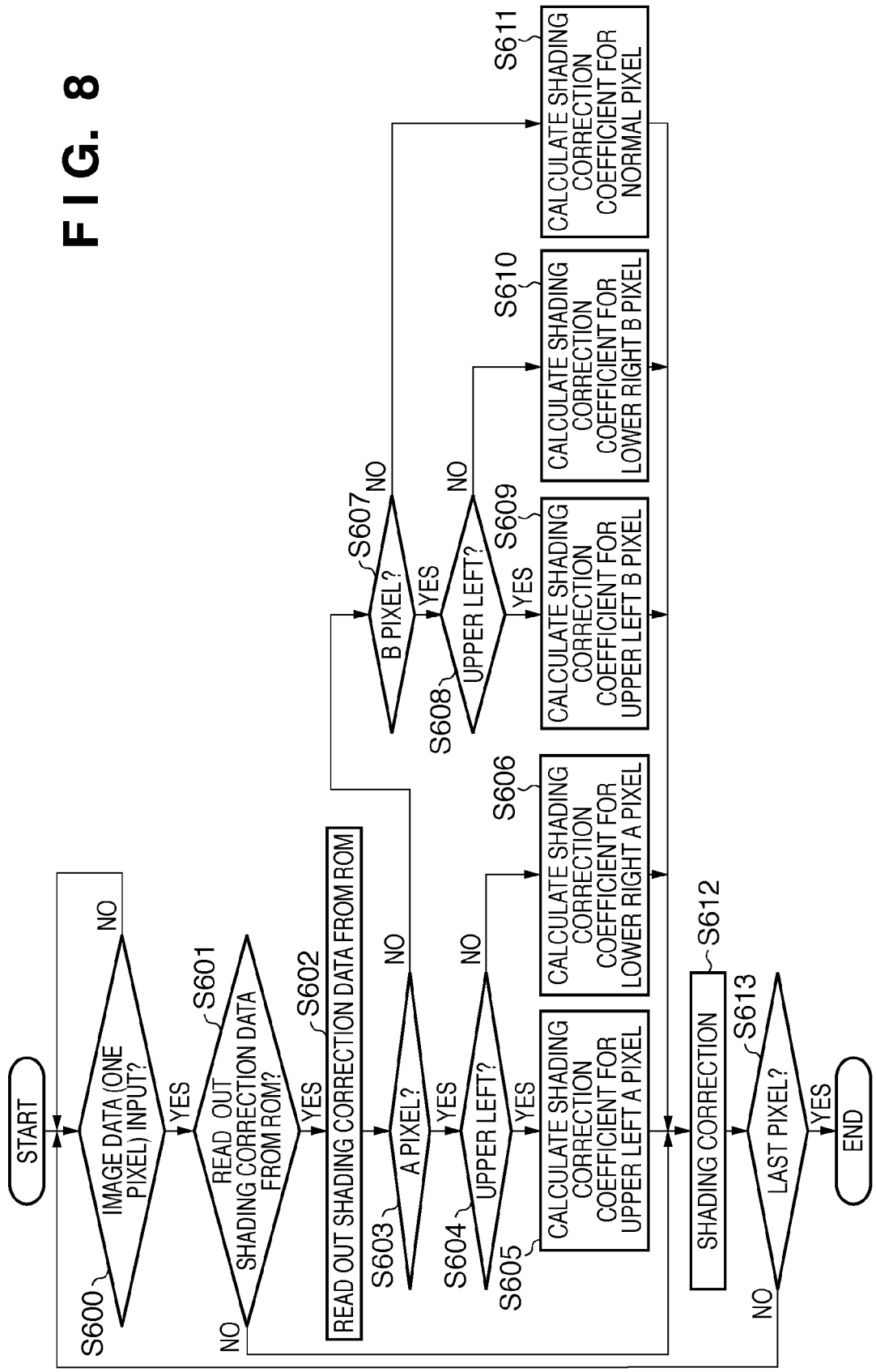
FIG. 8 is a flowchart for explaining a shading correction processing according to the third embodiment of the present invention.

Next, shading correction processing in the third embodiment will be described with reference to a flowchart of FIG. 8.

In step S600, it is determined whether or not image data (of one pixel) is input from the A/D conversion unit 105.

When the image data is input ("YES" in step S600), it is determined in step S601 whether or not shading correction data for the pixel to which the image data has been input is to be read out from the ROM 113.

In a case in which it is determined in step S601 that the shading correction data is to be read out ("YES" in step S601), the shading correction data is read out from the ROM 113 in step S602. The shading correction data in this case is shading correction data optimized for a normal pixel, for all of the pixels of the image sensor 101.

In step S603, it is determined if the pixel to be now subjected to shading correction is the A pixel.

In a case in which it is determined in step S603 that the pixel of interest is the A pixel ("YES" in step S603), it is determined if the pixel of interest is an upper left pixel with respect to the optical axis of the photographing lens in step S604.

In step S605, the shading correction coefficient S_a_up for the upper left A pixel with respect to the optical axis of the photographing lens is calculated from the shading correction data for the normal pixel which has been read from the ROM 113. In this case, as described above, the shading correction coefficient S_a_up is calculated by the shading correction coefficient generation unit 301 and the focus detection pixel shading correction coefficient generation unit 303.

In step S606, the shading correction coefficient. S_a_low for the lower right A pixel with respect to the optical axis of the photographing lens is calculated as described above from the shading correction data for the normal pixel which has been read from the ROM 113.

Alternatively, in a case in which the pixel to be now subjected to shading correction is not the A pixel, it is determined in step S607 if the pixel of interest is the B pixel.

In a case in which it is determined in step S607 that the pixel of interest is the B pixel ("YES" in step S607), it is determined in step S608 if the pixel of interest is an upper left pixel with respect to the optical axis of the photographing lens.

In step S609, the shading correction coefficient S_b_up for the upper left B pixel with respect to the optical axis of the photographing lens is calculated as described above from the shading correction data for the normal pixel which has been read from the ROM 113.

In step S610, the shading correction coefficient S_b_low for the lower right B pixel with respect to the photographing lens is calculated as described above from the shading correction data for the normal pixel which has been read from the ROM 113.

On the other hand, since the pixel to be now subjected to shading correction is a normal pixel in step S611, the shading correction coefficient S_norm for the normal pixel is calculated from the shading correction data read out from the ROM 113. In this case, the shading correction coefficient S_norm is calculated by the shading correction coefficient generation unit 301.

As described above, any of step S605, step S606, step S609, step S610, and step S611 is executed depending on the type and position of the pixel of the input image data.

In step S612, the shading correction coefficient generated by the shading correction coefficient generation unit 301 or the focus detection pixel shading correction coefficient generation unit 303 is used to apply shading correction processing to the image data input in step S600.

In step S613, it is determined if the image data subjected to the shading correction processing in step S612 corresponds to the last pixel read out from the image sensor 101. If the image data corresponds to the last pixel ("YES" in step S613), the processing is completed. If not ("NO" in step S613), the processing returns to step S600, and again moves to determining if the next image data is input.

Figure 9:
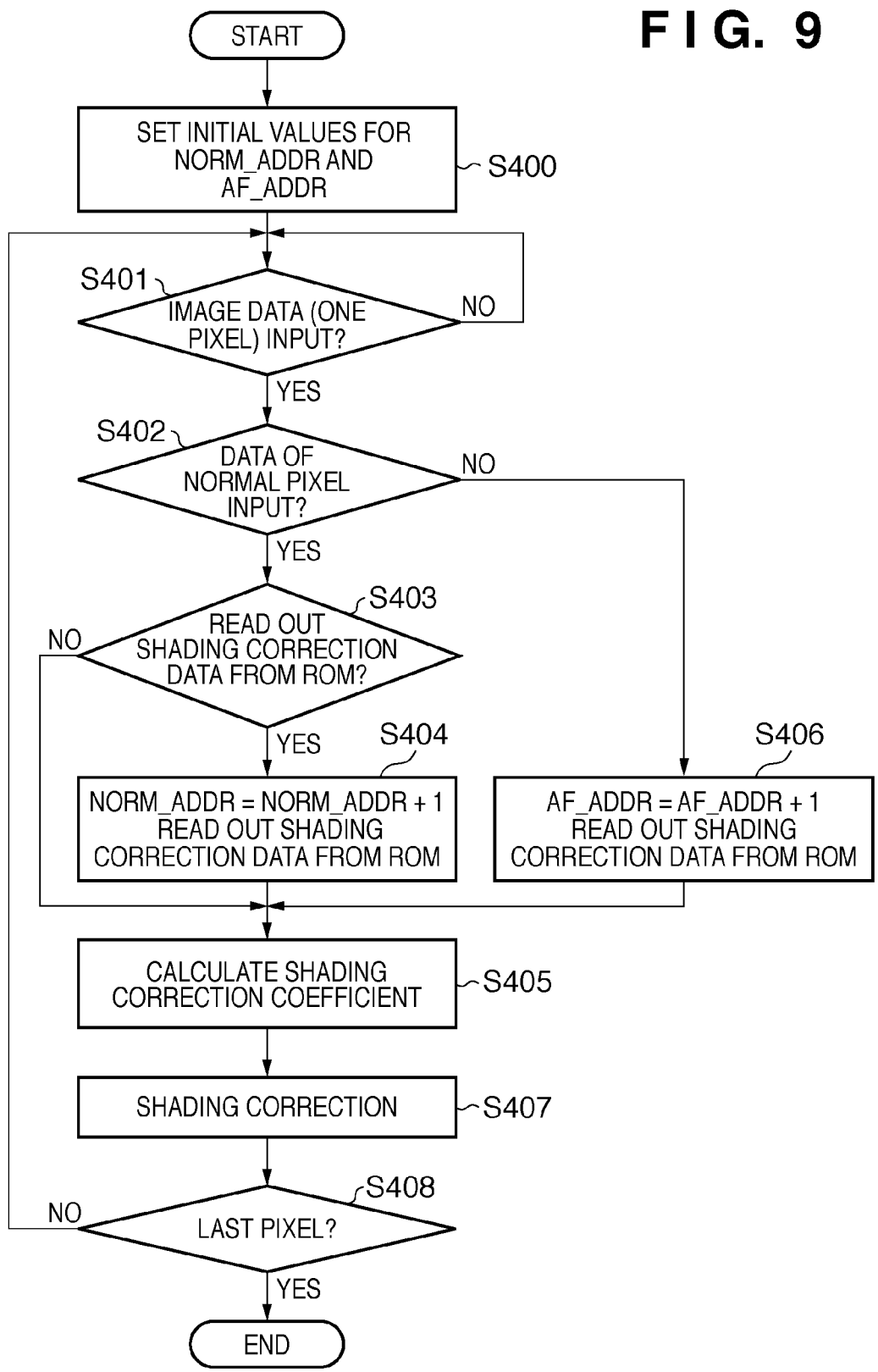
FIG. 9 is a flowchart for explaining a shading correction processing according to the fourth embodiment of the present invention.
Figure 10A:
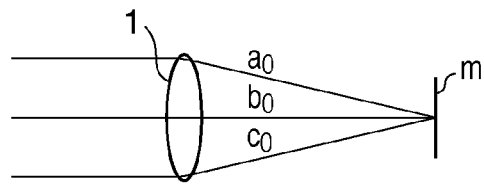
FIGS. 10A and 10B are diagrams for explaining a focus state detection method.
Figure 10B:
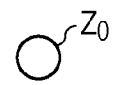
Figure 11A:
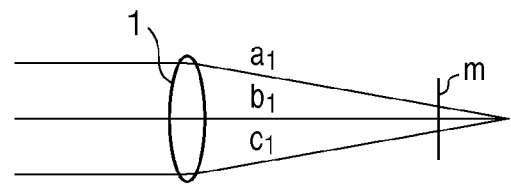
FIGS. 11A and 11B are diagrams for explaining a focus state detection method.
Figure 11B:
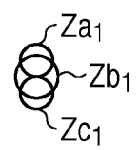
Figure 12A:
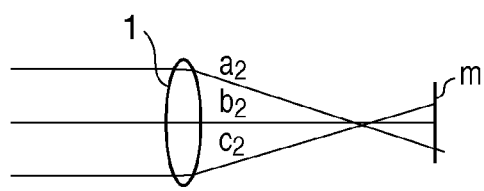
FIGS. 12A and 12B are diagrams for explaining a focus state detection method.
Figure 12B:
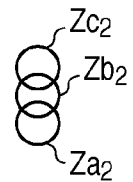
Figure 13:
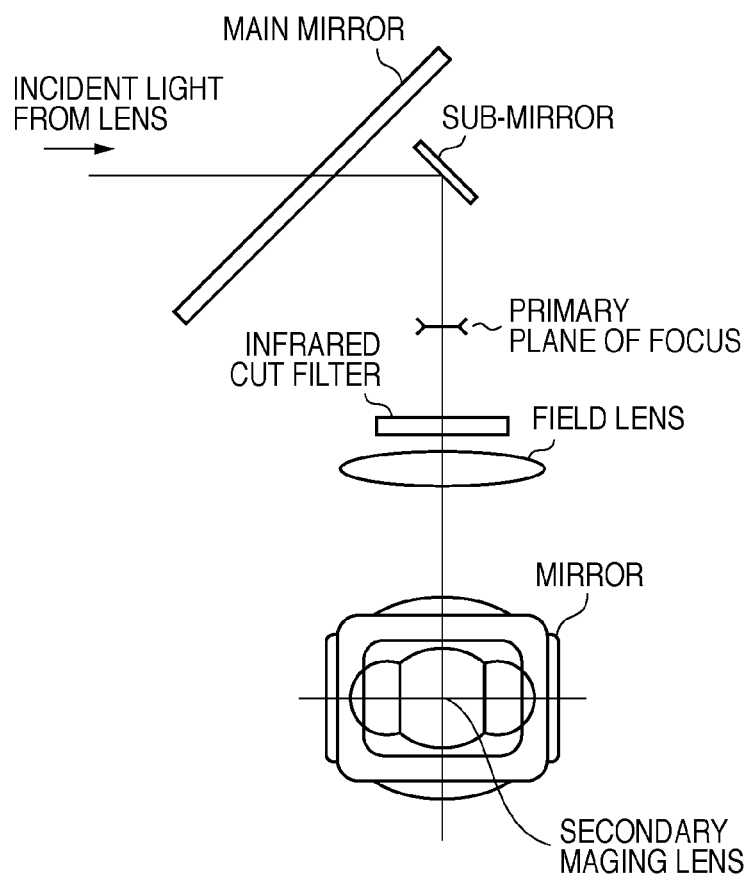
FIG. 13 is a diagram illustrating the internal configuration of a typical camera for detecting a phase difference.
Figure 14A:
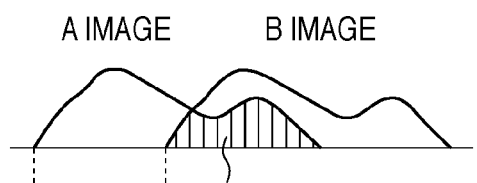
FIGS. 14A to 14C are diagrams for explaining correlation calculation.
Figure 14B:
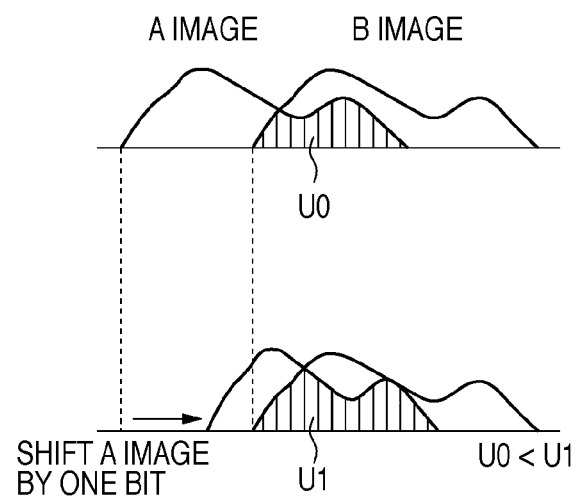
Figure 14C:
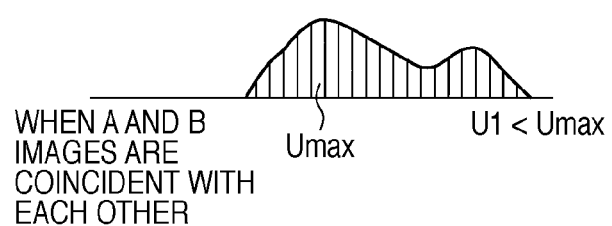

In the fourth embodiment, the difference between it and the first embodiment is described. FIG. 9 is a diagram illustrating a flowchart according to the fourth embodiment. Since each step of the processing shown in FIG. 9 is substantially the same as that in the flowchart of FIG. 4, the same steps of the processing are denoted by the same reference numerals to omit the details of each step of the processing. However, the fourth embodiment is different in that, after reading out shading correction data for a focus detection pixel from the ROM 113 in step S406, a shading correction coefficient is calculated in the same way as for the normal pixel in step S405. In the first embodiment, the shading correction coefficient is stored in the ROM 113 as the shading correction data for focus detection pixels. Therefore, the data read from the ROM 113 is used as the shading correction coefficient without processing the data. By contrast, in the fourth embodiment, shading correction data is stored in a form from which a shading correction coefficient needs to be calculated even for focus detection pixels. Therefore, the shading correction coefficients are calculated. The shading correction coefficient for the focus detection pixels may be calculated in the same way as for the normal pixels, or may be calculated by different calculation methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-061842, filed on Mar. 11, 2008, and 2009-043150, filed on Feb. 25, 2009, which are hereby incorporated by reference herein in their entirety.

The invention claimed is:

1. An image capturing apparatus comprising:
an image sensor that is configured to collect via a microlens light incident through an optical system to capture an image, the image sensor including an imaging pixel for receiving light through an opening with a center position coincident with the optical axis of the microlens, a first focus detection pixel for receiving pupil-divided light through a first opening offset in a first direction from the optical axis of the microlens, and a second focus detection pixel for receiving pupil-divided light through a second opening offset in a second direction different from the first direction from the optical axis of the microlens;
a correction unit configured to perform different shading correction on image data having been sequentially A/D converted and sequentially inputted, in accordance with whether the image data is of the imaging pixel, the first focus detection pixel, or the second focus detection pixel;
an image processing unit configured to perform image processing on the image data having undergone the shading correction by the correction unit; and
a focus detection unit configured to detect a focus state from the image data output from the first and second focus detection pixels.

2. The image capturing apparatus according to claim 1, further comprising a storage unit configured to store correction data for the imaging pixel and correction data for the first and second focus detection pixels,
wherein the correction unit calculates a shading correction coefficient for the imaging pixel based on the correction data for the imaging pixel and uses the correction data for the first and second focus detection pixels as-is as shading correction coefficients for the first and second focus detection pixels.

3. The image capturing apparatus according to claim 2, wherein, as the correction data for the first and second focus detection pixels, the storage unit stores the correction data for the first focus detection pixel for carrying out shading correction of the first focus detection pixel in a first storage area, and stores the correction data for the second focus detection pixel for carrying out shading correction of the second focus detection pixel in a second storage area, and
wherein the correction unit uses the correction data for the first focus detection pixel as-is as the shading correction coefficient for the first focus detection pixel, and uses the correction data for the second focus detection pixel as-is as the shading correction coefficient for the second focus detection pixel.

4. The image capturing apparatus according to claim 1, further comprising a determination unit configured to determine whether a pixel intended for shading correction is any of the imaging pixel, the first focus detection pixel, and the second focus detection pixel, and, in a case in which the pixel intended for shading correction is the first focus detection pixel or the second focus detection pixel, determine a position of the pixel intended for shading correction in the image sensor,
wherein the correction unit performs shading correction depending on the determination result by the determination unit.

5. The image capturing apparatus according to claim 1, further comprising a storage unit configured to store correction data for the imaging pixel and correction data for the first and second focus detection pixels as correction data for carrying out the shading correction, and
wherein the correction unit corrects the imaging pixel based on the correction data for the imaging pixel, and corrects the first and second focus detection pixels based on the correction data for the first and second focus detection pixels.

6. The image capturing apparatus according to claim 1, further comprising:
a calculation unit configured to calculate a defocus amount from an in-focus position, from pixel outputs of the first and second focus detection pixels; and
a moving unit configured to move the optical system of the image capturing apparatus to the in-focus position, depending on the defocus amount.

7. An image processing method for pixel signals output from an image sensor for collecting via a microlens light incident through an optical system to capture an image, the image sensor including an imaging pixel for receiving light through an opening with a center position coincident with the optical axis of the microlens, a first focus detection pixel for receiving pupil-divided light through a first opening offset in a first direction from the optical axis of the microlens, and a second focus detection pixel for receiving pupil-divided light through a second opening offset in a second direction different from the first direction from the optical axis of the microlens, said method comprising:
a correction step of performing different shading correction on image data having been sequentially A/D converted and sequentially inputted, in accordance with whether the image data is of the imaging pixel, the first focus detection pixel, or the second focus detection pixel;

an image processing step of performing image processing on the image data having undergone the shading correction in the correction step; and a focus detection step of detecting a focus state from the image data output from the first and second focus detection pixels.

8. An apparatus comprising:

image sensor means for collecting via a microlens light incident through an optical system to capture an image, the image sensor means including an imaging pixel for receiving light through an opening with a center position coincident with the optical axis of the microlens, a first focus detection pixel for receiving pupil-divided light through a first opening offset in a first direction from the optical axis of the microlens, and a second focus detection pixel for receiving pupil-divided light through a second opening offset in a second direction different from the first direction from the optical axis of the microlens;

correction means for performing different shading correction on image data having been sequentially A/D converted and sequentially inputted, in accordance with whether the image data is of the imaging pixel, the first focus detection pixel, or the second focus detection pixel;

image processing means for performing image processing on the image data having undergone the shading correction by the correction means; and focus detection means for detecting a focus state from the image data output from the first and second focus detection pixels.

9. The image capturing apparatus according to claim 1, further comprising a storage unit configured to store correction data, wherein the correction unit corrects the image data from the imaging pixel with correction data based on the stored correction data.

10. The image capturing apparatus according to claim 1, wherein the correction unit performs shading correction with use of shading correction coefficients for the image pixel and the first and the second focus detection pixels.

11. An image capturing apparatus comprising:

an image sensor that is configured to collect via a microlens light incident through an optical system to capture an image, the image sensor including a first focus detection pixel which relates to detection of a focus state and is offset in a first direction from the optical axis of the microlens, a second focus detection pixel which relates to detection of a focus state and is offset in a second direction different from the first direction from the optical axis of the microlens, and an imaging pixel;

a correction unit configured to perform different shading correction on image data having been sequentially A/D converted and sequentially inputted, in accordance with whether the image data is of the imaging pixel, the first focus detection pixel, or the second focus detection pixel;

an image processing unit configured to perform image processing on the image data having undergone the shading correction by the correction unit; and a focus detection unit configured to detect a focus state from the image data output from the first and second focus detection pixels.

12. The image capturing apparatus according to claim 11, further comprising a storage unit configured to store correction data for the imaging pixel and correction data for the first and second focus detection pixels, wherein the correction unit calculates a shading correction coefficient for the imaging pixel based on the correction data for the imaging pixel and uses the correction data for the first and second focus detection pixels as-is as shading correction coefficients for the first and second focus detection pixels.

13. The image capturing apparatus according to claim 12, wherein, as the correction data for the first and second focus detection pixels, the storage unit stores the correction data for the first focus detection pixel for carrying out shading correction of the first focus detection pixel in a first storage area, and stores the correction data for the second focus detection pixel for carrying out shading correction of the second focus detection pixel in a second storage area, and wherein the correction unit uses the correction data for the first focus detection pixel as-is as the shading correction coefficient for the first focus detection pixel, and uses the correction data for the second focus detection pixel as-is as the shading correction coefficient for the second focus detection pixel.

14. The image capturing apparatus according to claim 11, further comprising a determination unit configured to determine whether a pixel intended for shading correction is any of the imaging pixel, the first focus detection pixel, and the second focus detection pixel, and, in a case in which the pixel intended for shading correction is the first focus detection pixel or the second focus detection pixel, determine a position of the pixel intended for shading correction in the image sensor, wherein the correction unit performs shading correction depending on the determination result by the determination unit.

15. The image capturing apparatus according to claim 11, further comprising a storage unit configured to store correction data for the imaging pixel and correction data for the first and second focus detection pixels as correction data for carrying out the shading correction, and wherein the correction unit corrects the imaging pixel based on the correction data for the imaging pixel, and corrects the first and second focus detection pixels based on the correction data for the first and second focus detection pixels.

16. The image capturing apparatus according to claim 11, further comprising:

a calculation unit configured to calculate a defocus amount from an in-focus position, from pixel outputs of the first and second focus detection pixels; and a moving unit configured to move the optical system of the image capturing apparatus to the in-focus position, depending on the defocus amount.

17. The image capturing apparatus according to claim 11, further comprising a storage unit configured to store correction data, wherein the correction unit corrects the image data from the imaging pixel with correction data generated based on the stored correction data.

18. The image capturing apparatus according to claim 11, wherein the correction unit performs shading correction with use of shading correction coefficients for the image pixel and the first and the second focus detection pixels.

19. An image processing method for pixel signals output from an image sensor for collecting via a microlens light incident through an optical system to capture an image, the image sensor including a first focus detection pixel which relates to detection of a focus state and is offset in a first direction from the optical axis of the microlens, a second focus detection pixel which relates to detection of a focus state and is offset in a second direction different from the first direction from the optical axis of the microlens, and an imaging pixel, said method comprising:
- a correction step of performing different shading correction on image data having been sequentially A/D converted and sequentially inputted, in accordance with whether the image data is of the imaging pixel, the first focus detection pixel, or the second focus detection pixel;
- an image processing step of performing image processing on the image data having undergone the shading correction in the correction step; and
- a focus detection step of detecting a focus state from the image data output from the first and second focus detection pixels.

20. An apparatus comprising:
- image sensor means for collecting via a microlens light incident through an optical system to capture an image, the image sensor means including a first focus detection pixel which relates to detection of a focus state and is offset in a first direction from the optical axis of the microlens, a second focus detection pixel which relates to detection of a focus state and is offset in a second direction different from the first direction from the optical axis of the microlens, and an imaging pixel;
- correction means for performing different shading correction on image data having been sequentially A/D converted and sequentially inputted, in accordance with whether the image data is of the imaging pixel, the first focus detection pixel, or the second focus detection pixel;
- image processing means for performing image processing on the image data having undergone the shading correction by the correction means; and
- focus detection means for detecting a focus state from the image data output from the first and second focus detection pixels.

* * * * *